United States Patent
Chen

(10) Patent No.: US 12,309,472 B1
(45) Date of Patent: May 20, 2025

(54) CAMERA DEVICE

(71) Applicant: Yingmei Chen, Guangdong (CN)

(72) Inventor: Yingmei Chen, Guangdong (CN)

( * ) Notice: Subject to any disclaimer, the term of this patent is extended or adjusted under 35 U.S.C. 154(b) by 0 days.

(21) Appl. No.: 19/031,688

(22) Filed: Jan. 18, 2025

(30) Foreign Application Priority Data

Jan. 8, 2025 (CN) .......................... 202520043445.1

(51) Int. Cl.
*H04N 23/51* (2023.01)
*G03B 15/00* (2021.01)
*G03B 17/02* (2021.01)

(52) U.S. Cl.
CPC .............. *H04N 23/51* (2023.01); *G03B 15/00* (2013.01); *G03B 17/02* (2013.01)

(58) Field of Classification Search
CPC ......... H04N 23/51; G03B 15/00; G03B 17/02
See application file for complete search history.

(56) References Cited

U.S. PATENT DOCUMENTS

| | | | |
|---|---|---|---|
| 2007/0014569 A1* | 1/2007 | Yu ........................... | G03B 29/00 396/542 |
| 2017/0353663 A1* | 12/2017 | Asakawa .............. | G02B 27/644 |
| 2019/0018258 A1* | 1/2019 | Minamisawa ....... | H04N 23/687 |
| 2022/0329712 A1* | 10/2022 | Wang ................... | H05K 1/0277 |
| 2023/0164250 A1* | 5/2023 | Lin ......................... | H04N 23/51 348/373 |
| 2024/0398218 A1* | 12/2024 | Lent ....................... | H05K 1/181 |

* cited by examiner

*Primary Examiner* — Amy R Hsu
(74) *Attorney, Agent, or Firm* — Daniel M. Cohn

(57) ABSTRACT

A camera device includes a rotating roller, a camera, a flexible circuit board, and a housing. The rotating roller is disposed in the housing, the flexible circuit board is of a strip shape. A first end of the flexible circuit board is connected to the camera. A second end of the flexible circuit board is connected to the rotating roller. The flexible circuit board is disposed around the rotating roller, so that the camera is flexibly stretchable through the flexible circuit board. When shooting, the housing is placed at a desired position, which is flexible and convenient to use. In addition, the camera is flexibly stretchable, so the camera is allowed to be applied to different usage scenarios. After use, the flexible circuit board is retracted to be disposed around the rotating roller by rotating the rotating roller to realize the storage of the flexible circuit board.

20 Claims, 12 Drawing Sheets

CAMERA DEVICE

TECHNICAL FIELD

The present disclosure relates to a field of camera devices, and in particular to a camera device.

BACKGROUND

In fast-paced work and life of modern people, it is necessary to shoot videos to record scenes in many cases. Especially in some special scenes, in order not to arouse suspicion of a person being filmed, it is necessary to shoot more secretly. For example, when reporters are secretly investigating, when police are secretly collecting evidences, when lawyers need to shoot evidence in a process of handling cases, or when ordinary citizens encounter criminal acts that need to be recorded, they all need to shoot secretly. Currently, a conventional camera device generally includes a housing and a camera. Since the camera is fixed on the housing, the conventional camera device is inconvenient to use. Therefore, it is necessary to provide a more flexible and convenient camera device to meet needs of users.

SUMMARY

To solve defects in the prior art, the present disclosure provides a camera device. The camera device comprises a rotating roller, a camera, a flexible circuit board, and a housing. The rotating roller is disposed in the housing, the flexible circuit board is of a strip shape. A first end of the flexible circuit board is connected to the camera. A second end of the flexible circuit board is connected to the rotating roller. The flexible circuit board is disposed around the rotating roller, so that the camera is flexibly stretchable through the flexible circuit board.

The rotating roller is capable of elastically rotating, so that the flexible circuit board is elastically retractable around the rotating roller.

The rotating roller comprises a central shaft, a mounting base, and an elastic piece. The mounting base is fixed in the housing. The elastic piece enables the central shaft to be elastically rotatably disposed on the mounting base. The second end of the flexible circuit board is connected to the central shaft.

The elastic piece is a clockwork spring. An accommodating cavity is defined in a center of the central shaft. The clockwork spring is disposed in the accommodating cavity. A first end of the clockwork spring is connected to a side wall of the accommodating cavity. A second end of the clockwork spring is connected to the mounting base.

An inserting rod is disposed on the mounting base. The inserting rod is inserted into the accommodating cavity and is connected to the second end of the clockwork spring.

The camera device further comprises a locking device. When the flexible circuit board stretches to a predetermined position, the locking device is configured to lock the rotating roller in an elastic retracting direction. When the locking device is unlocked, the rotating roller drives the flexible circuit board to elastically retract.

A first mounting frame is disposed in the housing. The locking device comprises a ratchet disposed on the rotating roller and a check pawl disposed on the first mounting frame. When the check pawl is engaged with one of ratchet teeth of the ratchet, the check pawl locks the rotating roller in the elastic retracting direction. When the check pawl is disengaged from the one of the ratchet teeth, the rotating roller drives the flexible circuit board to elastically retract.

The locking device further comprises a push rod and a torsion spring. The push rod is disposed on the first mounting frame. The push rod is connected to the check pawl. A mounting shaft portion and a stand column are disposed on the first mounting frame. The torsion spring is sleeved on the mounting shaft portion. A first end of the torsion spring is connected to the push rod, and a second end of the torsion spring is connected to the stand column.

A second mounting frame is disposed in the housing. The locking device comprises a mounting plate disposed on the rotating roller and a swing arm disposed on the second mounting frame. A locking guide rail is disposed on the mounting plate, the swing arm comprises a locking block, and the locking block is placed in the locking guide rail, so that the locking block is capable of locking the rotating roller in the elastic retracting direction.

The locking guide rail comprises a retraction guide rail and an extension guide rail disposed around the retraction guide rail. The locking block is allowed to be disposed in the retraction guide rail. A communication port is defined between the extension guide rail and the retraction guide rail. A guide block is disposed in the communication port. A front end of the guide block defines a first guide portion. The first guide portion of the guide block is configured to guide the locking block in the retraction guide rail into the extension guide rail. A rear end of the guide block defines a locking groove. The locking groove comprises a second guide portion and a third guide portion. The second guide portion of the locking groove is configured to guide the locking block in the extension guide rail to the locking groove. The third guide portion of the locking groove is configured to guide the locking block in the locking groove to the retraction guide rail.

The second mounting frame comprises a limiting groove. The swing arm is disposed in the limiting groove. The limiting groove is configured to limit a swing stroke of the swing arm. The locking block is protruded relative to the limiting groove.

The camera is disposed outside the housing. The flexible circuit board comprises an upper flexible circuit board and a lower flexible circuit board. The upper flexible circuit board is stacked on the lower flexible circuit board. A first end of the upper flexible circuit board is configured as a data connection end. A first end of the lower flexible circuit board passes through the housing and is connected to the camera, and a second end of the upper flexible circuit board is connected to a second end of the lower flexible circuit board.

The second end of the upper flexible circuit board and the second end of the lower flexible circuit board are integrally formed.

The rotating roller comprises a connecting rod. A bending portion of the second end of the upper flexible circuit board and a bending portion of the second end of the lower flexible circuit board are sleeved on the connecting rod.

The housing defines an opening. The first end of the lower flexible circuit board passes through the housing from the opening.

A clamping groove corresponding to the opening is defined in an outer side of the housing, and the camera is clamped in the clamping groove.

A lens of the camera faces the housing, or the lens of the camera is disposed opposite to the housing.

A main circuit board is disposed in the housing, and the data connection end of the upper flexible circuit board is connected to the main circuit board.

The present disclosure further provides a camera device. The video device comprises a rotating roller, a camera, and a flexible circuit board. The flexible circuit board is of a strip shape. A first end of the flexible circuit board is connected to the camera. A second end of the flexible circuit board is connected to the rotating roller. The flexible circuit board is disposed around the rotating roller, so that the camera is flexibly stretchable through the flexible circuit board.

The rotating roller is capable of elastically rotating, so that the flexible circuit board is elastically retractable around the rotating roller.

Through the above-mentioned structural configurations, when in use, the camera or the flexible circuit board is pulled to drive the rotating roller to rotate in a stretching direction, so that the camera is flexibly extended with the flexible circuit board. When shooting, the housing is placed in a desired position, which is flexible and convenient to use. In addition, the camera is flexibly stretched, so the camera is able to be applied to more usage scenarios, especially to covert shooting in special scenarios. For example, the housing is allowed to be placed in a backpack, and the camera is placed to an opening of the backpack through flexible stretching of the flexible circuit board to facilitate shooting. Alternatively, the housing is placed in a pocket of a coat, and the camera is placed in an opening of the pocket through the flexible stretching of the flexible circuit board to facilitate video recording. Of course, a user is able to place the camera according to a specific usage scenario, and various usage scenarios are not listed one by one herein.

After use, the flexible circuit board is rewound around the rotating roller by rotating the rotating roller, so as to realize storage of the flexible circuit board, which is convenient for use. Of course, the camera is able to take videos when the flexible circuit board is wrapped around the rotating roller, and the user is able to adjust a position of the camera according to the specific usage scenario.

BRIEF DESCRIPTION OF DRAWINGS

In order to clearly describe technical solutions in the embodiments of the present disclosure, the following will briefly introduce the drawings that need to be used in the description of the embodiments or the prior art. Apparently, the drawings in the following description are merely some of the embodiments of the present disclosure, and those skilled in the art are able to obtain other drawings according to the drawings without contributing any inventive labor.

The present disclosure is further described below in conjunction with the accompanying drawings and embodiments.

DETAILED DESCRIPTION

Figure 1:
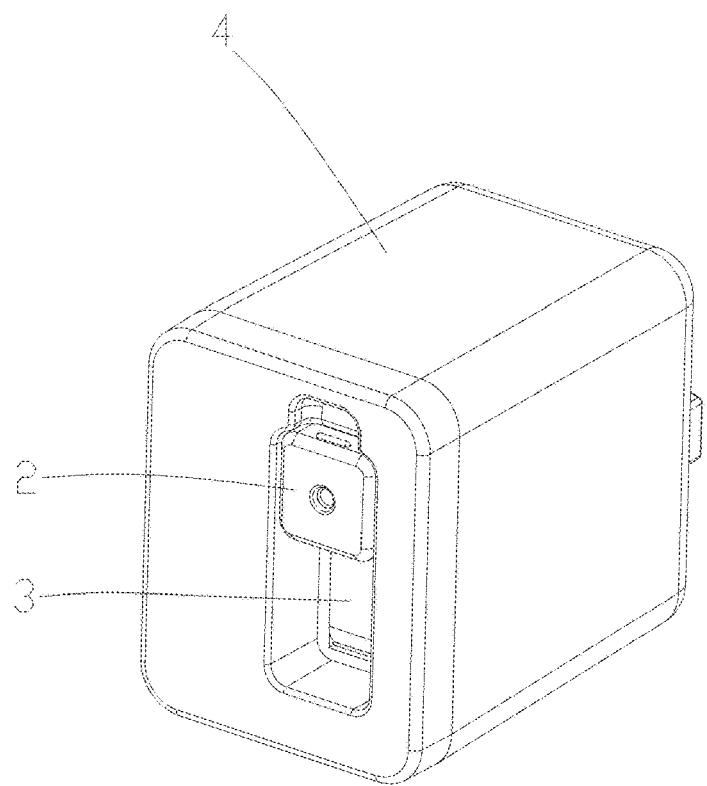
FIG. 1 is a structural schematic diagram of a camera device of the present disclosure where a lens of a camera thereof is opposite to a housing thereof.
Figure 2:
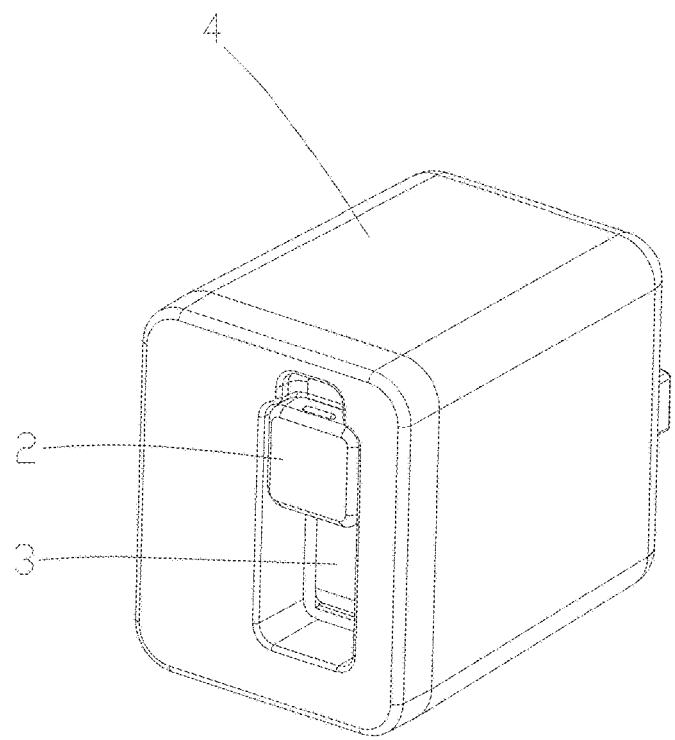
FIG. 2 is a structural schematic diagram of the camera device of the present disclosure where the lens of the camera thereof faces the housing thereof.
Figure 3:
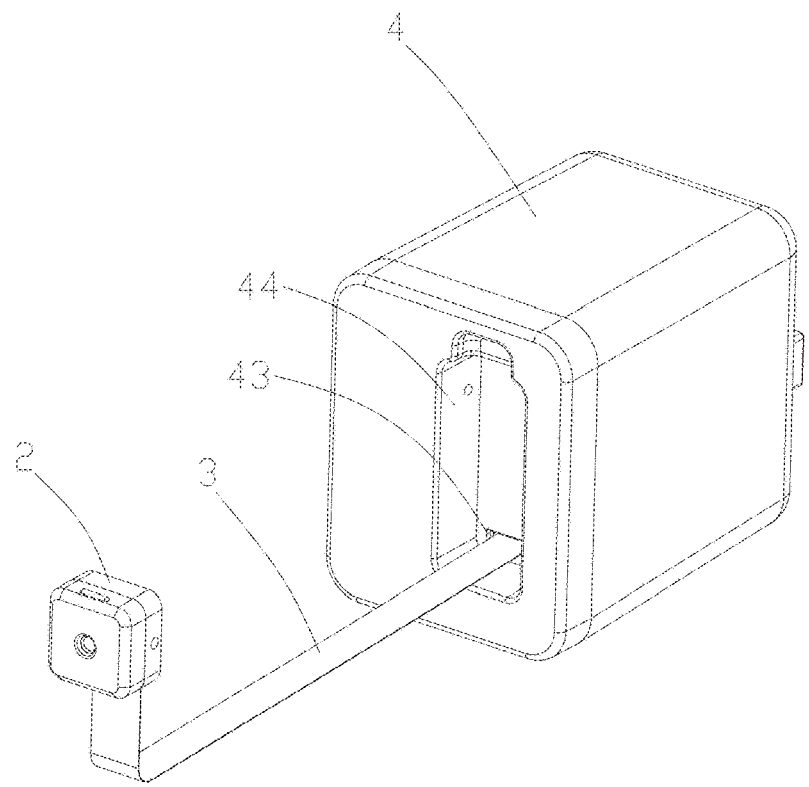
FIG. 3 is a schematic diagram of the camera shown in a stretched state.
Figure 4:
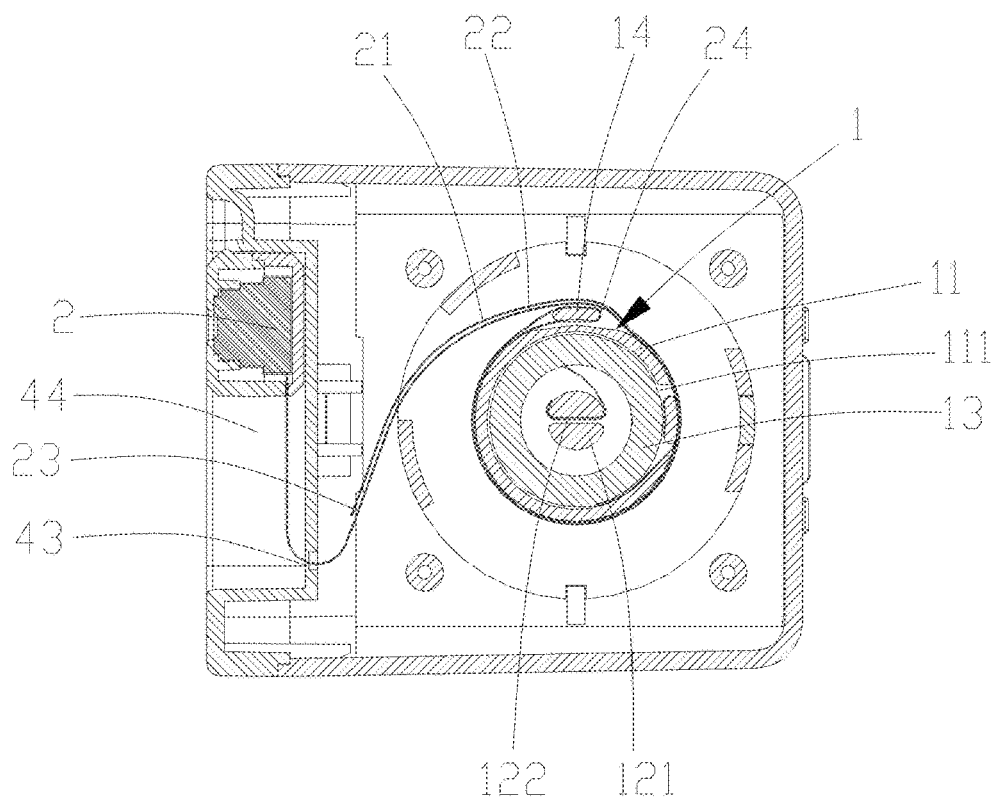
FIG. 4 is a cross-sectional schematic diagram of the camera device taken along a flexible circuit board thereof.
Figure 5:
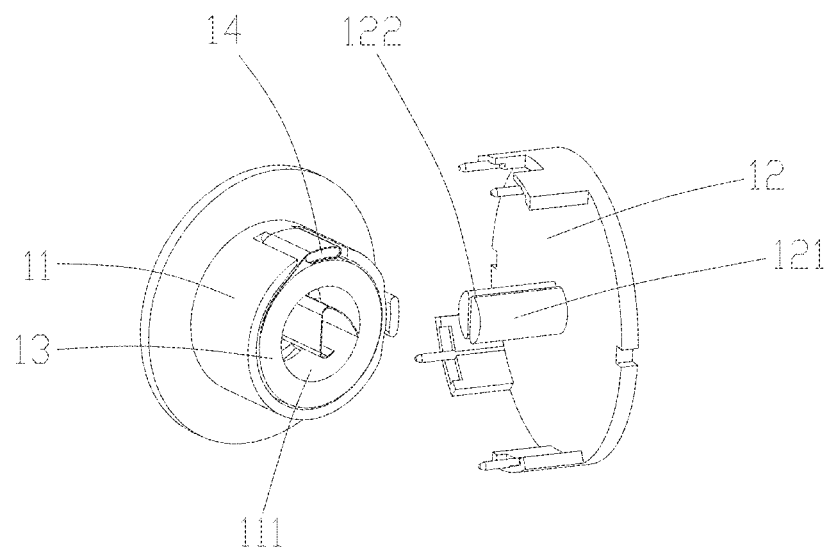
FIG. 5 is a structural schematic diagram of a rotating roller of the present disclosure.
Figure 6:
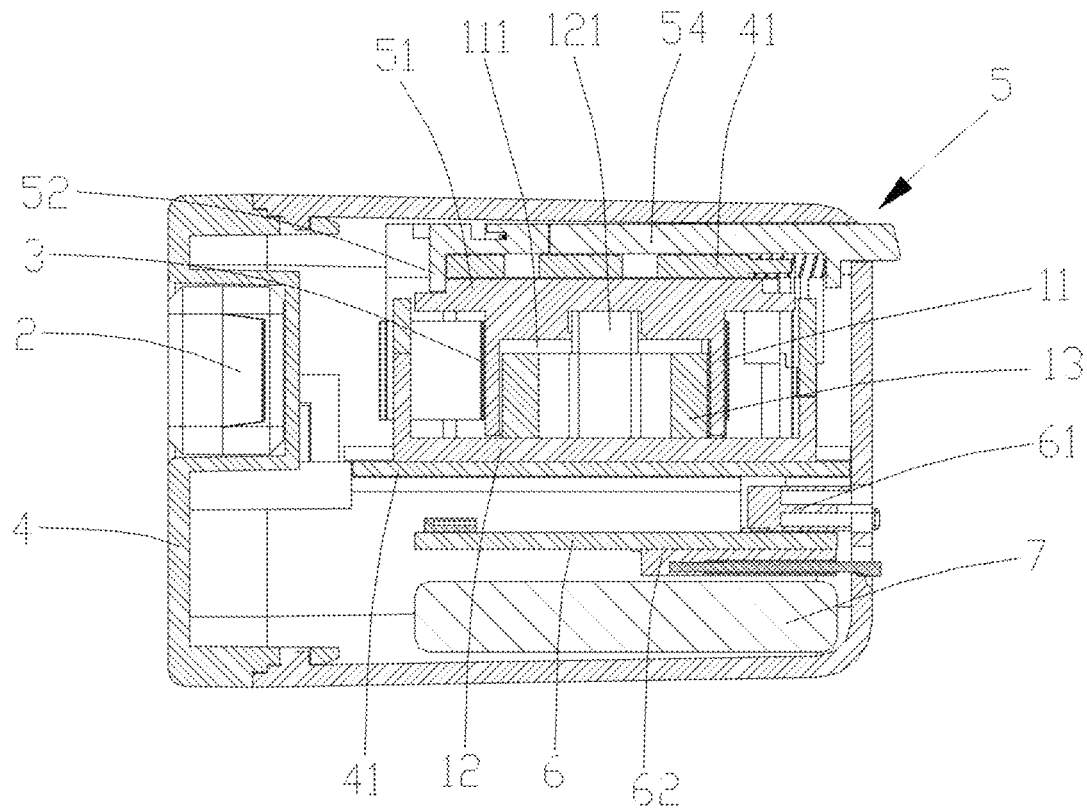
FIG. 6 is a cross-sectional schematic diagram of the camera device taken along a push rod thereof, and a locking device thereof is shown in a first alternative structure.
Figure 7:
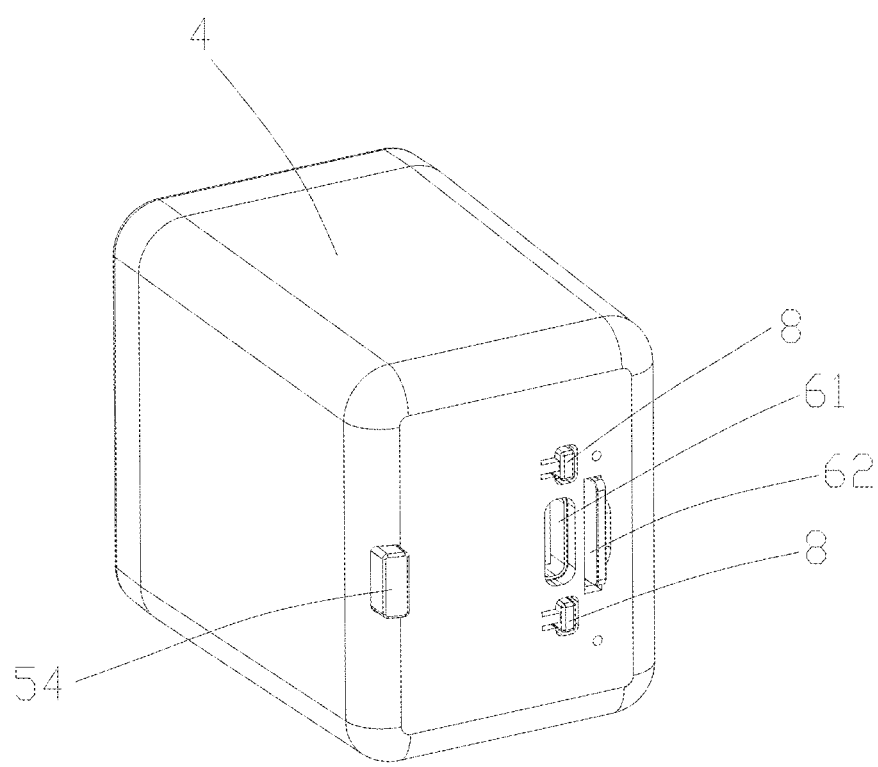
FIG. 7 is another structural schematic diagram of the camera device of the present disclosure.
Figure 8:
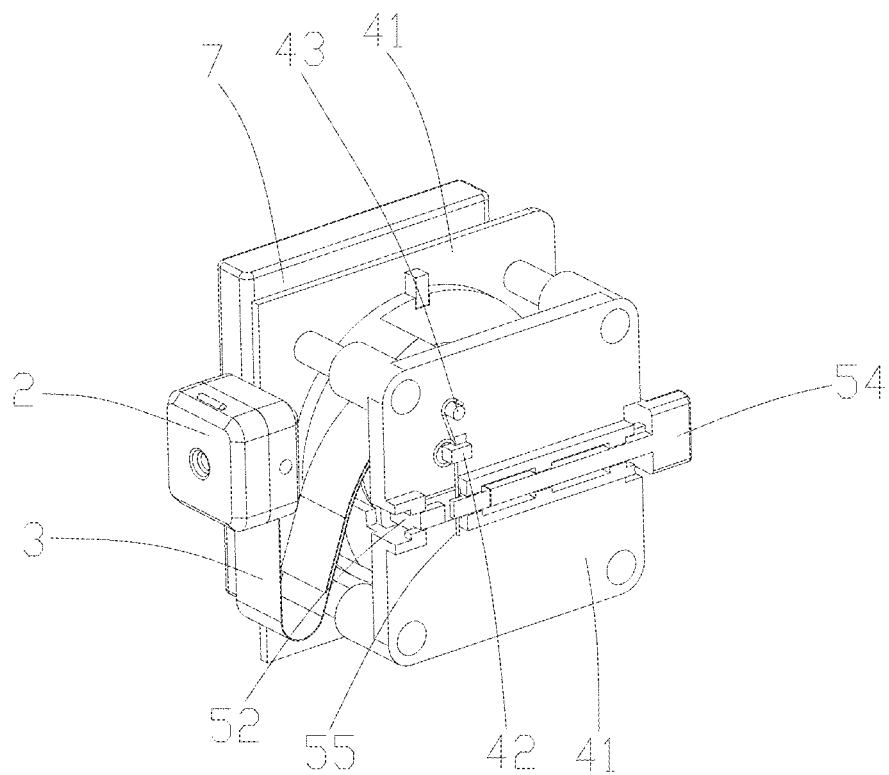
FIG. 8 is another structural schematic diagram of the camera device of the present disclosure, where the housing thereof is removed and the locking device thereof is shown in the first alternative structure.
Figure 9:
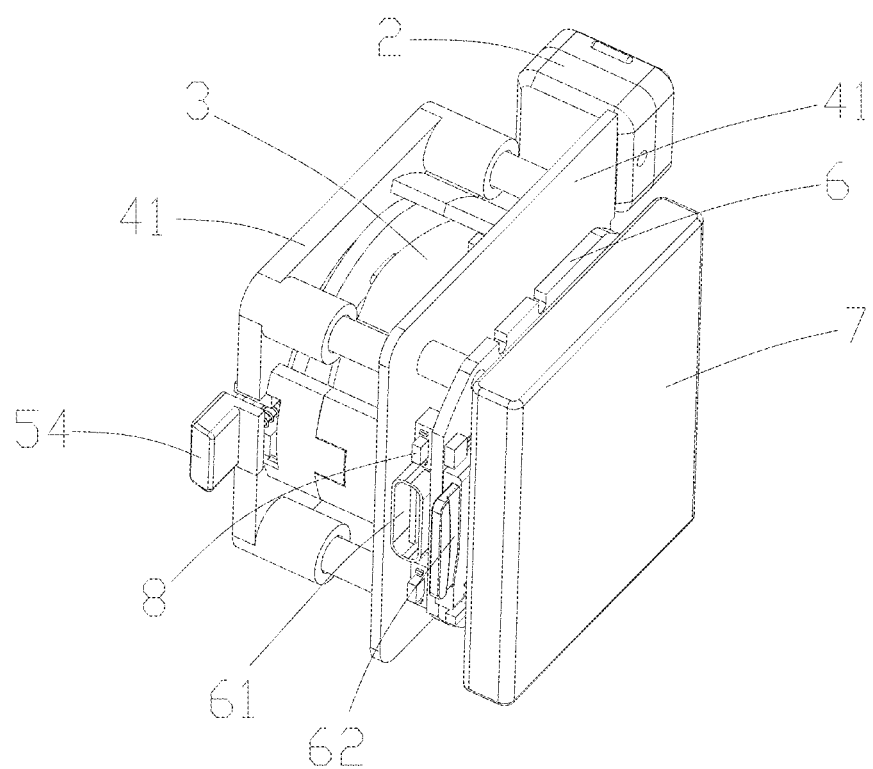
FIG. 9 is another structural schematic diagram of the camera device of the present disclosure, where the housing thereof is removed and the locking device thereof is shown in the first alternative structure.
Figure 10:
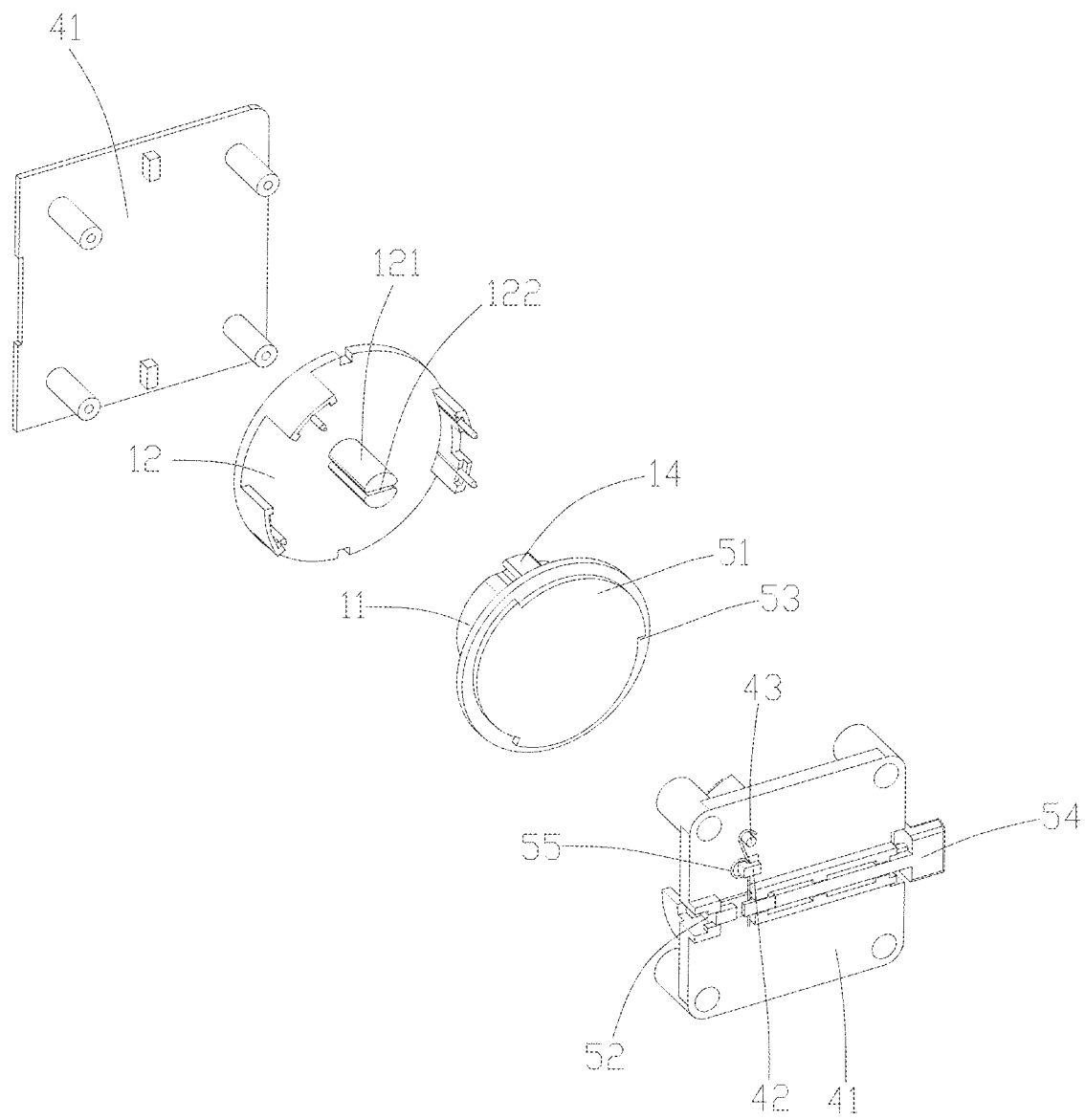
FIG. 10 is an exploded schematic diagram of a first mounting frame of the present disclosure, where the locking device thereof is shown in the first alternative structure.
Figure 11:
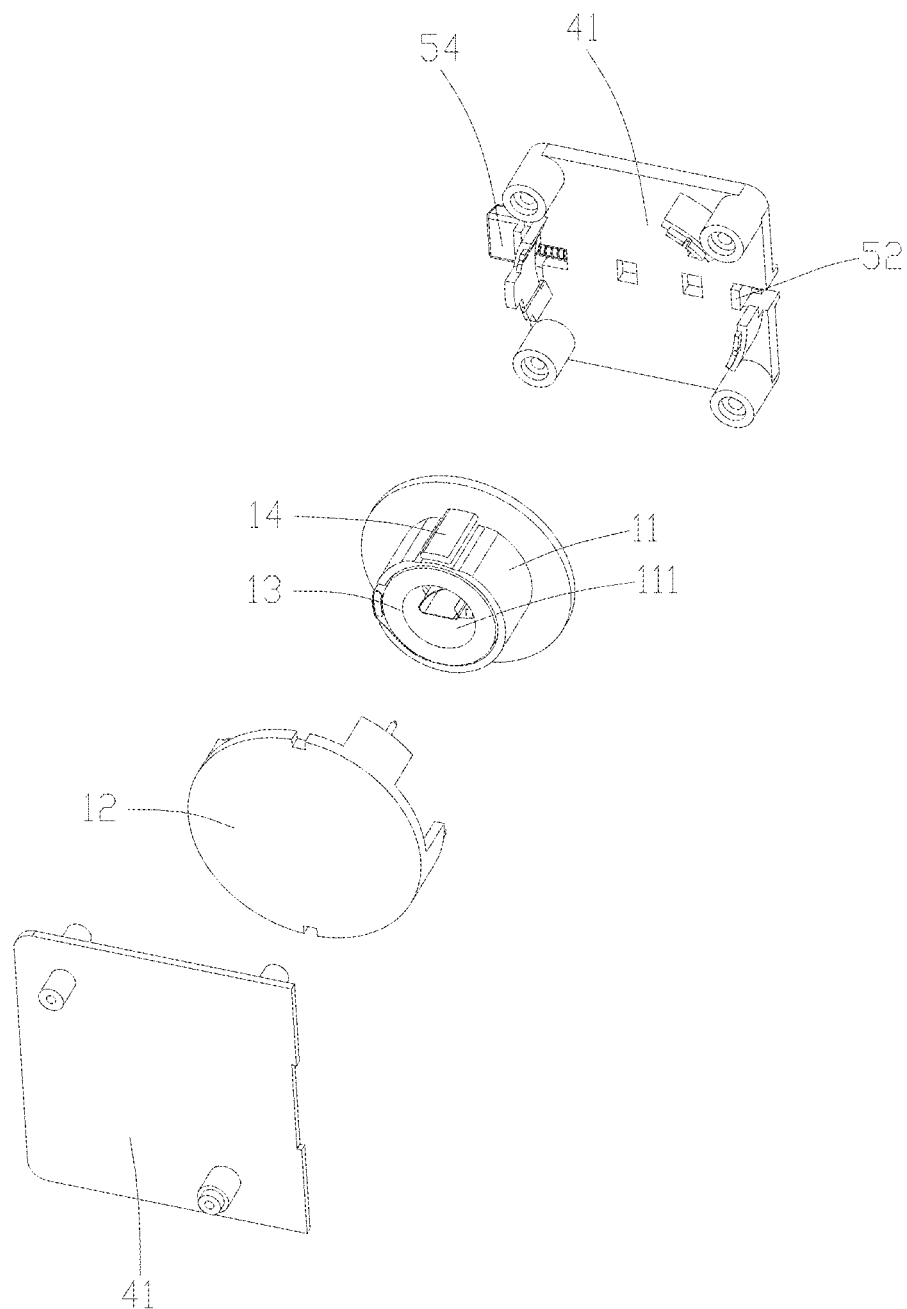
FIG. 11 is another exploded schematic diagram of the first mounting frame of the present disclosure, where the locking device thereof is shown in the first alternative structure.
Figure 12:
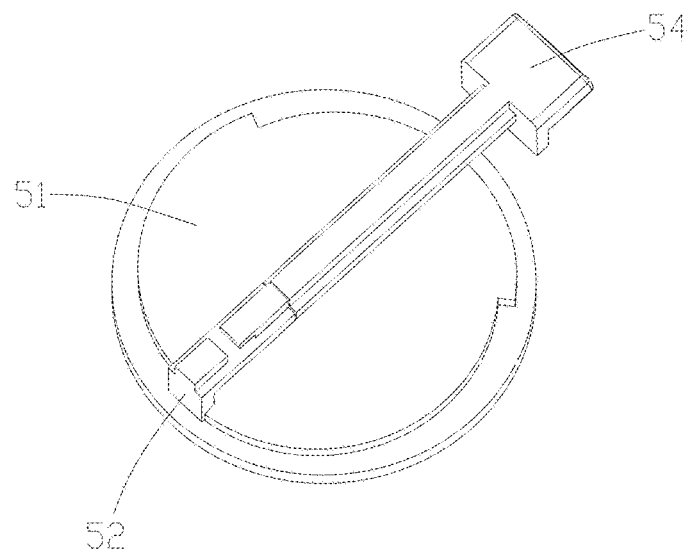
FIG. 12 is a schematic diagram of a push rod assembled with a ratchet of the present disclosure.
Figure 13:
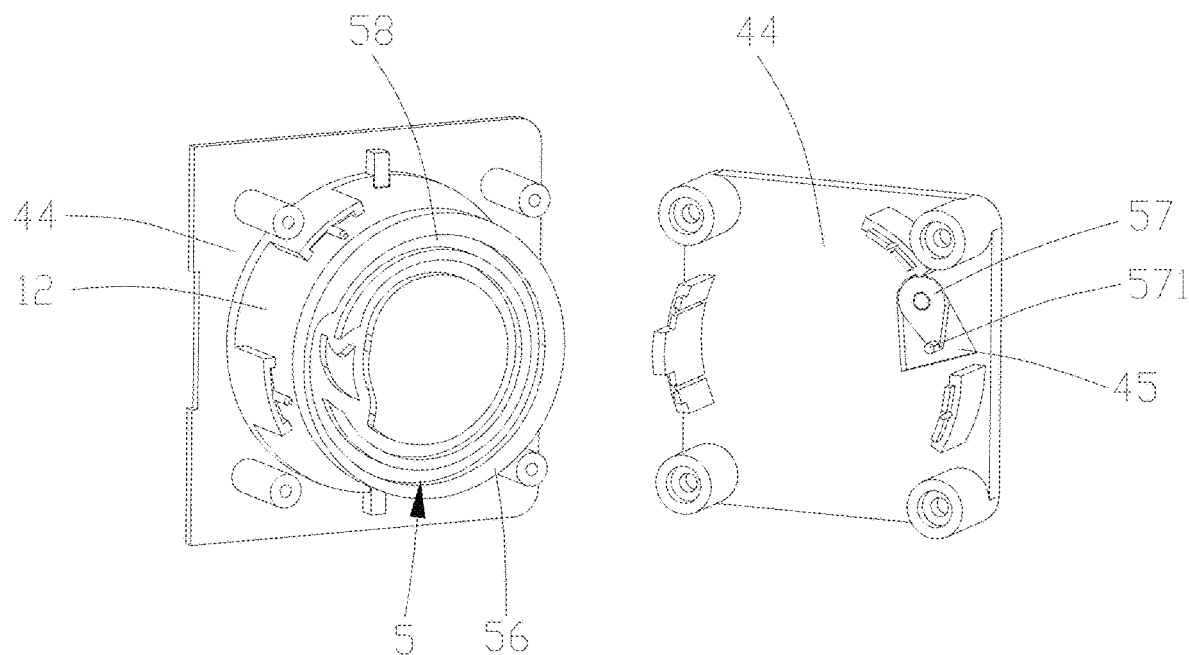
FIG. 13 is a schematic diagram of the locking device shown in a second alternative structure of the present disclosure.
Figure 14:
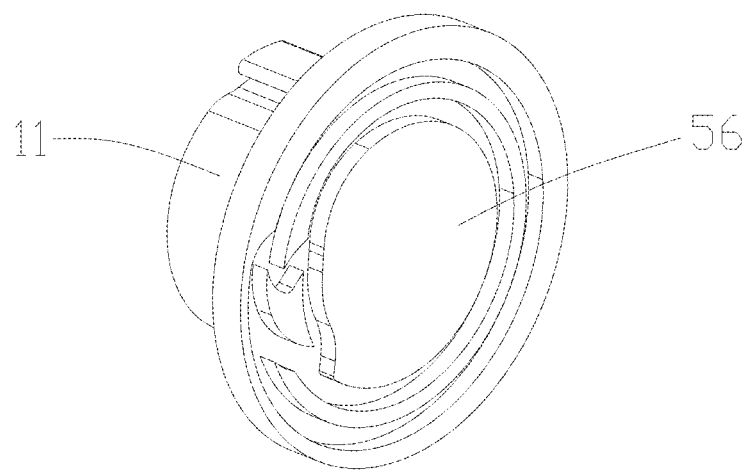
FIG. 14 is a schematic diagram of a mounting plate assembled with a central shaft of the present disclosure.
Figure 15:
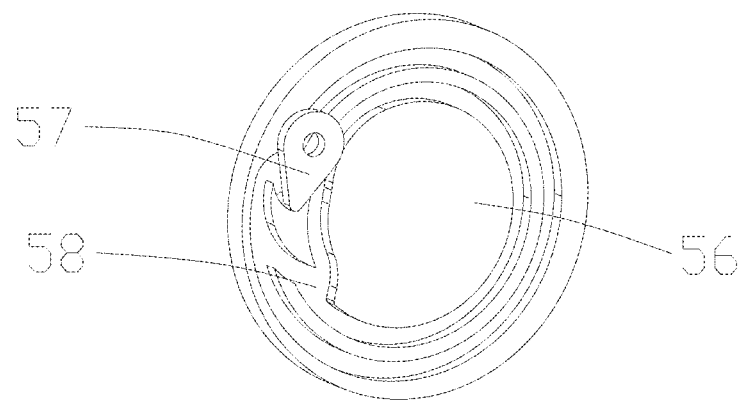
FIG. 15 is a schematic diagram of a locking guide rail assembled with a locking block of the present disclosure.

As shown in FIGS. 1-5, the present disclosure provides a camera device. The camera device comprises a rotating roller 1, a camera 2, a flexible circuit board 3, and a housing 4. The rotating roller 1 is disposed in the housing 4, the flexible circuit board 3 is of a strip shape. A first end of the flexible circuit board 3 is connected to the camera 2. A second end of the flexible circuit board 3 is connected to the rotating roller 1. The flexible circuit board 3 is disposed around the rotating roller 1, so that the camera 2 is flexibly stretchable through the flexible circuit board 3.

Through the above-mentioned structural configurations, when in use, the camera 2 or the flexible circuit board 3 is pulled to drive the rotating roller 1 to rotate in a stretching direction, so that the camera 2 is flexibly extended with the flexible circuit board 3. When shooting, the housing 4 is placed in a desired position, which is flexible and convenient to use. In addition, the camera 2 is flexibly stretched, so the camera 2 is able to be applied to more usage scenarios, especially to covert shooting in special scenarios. For example, the housing 4 is allowed to be placed in a backpack, and the camera 2 is placed to an opening of the backpack through flexible stretching of the flexible circuit board 3 to facilitate shooting. Alternatively, the housing 4 is placed in a pocket of a coat, and the camera 2 is placed in an opening of the pocket through the flexible stretching of the flexible circuit board 3 to facilitate video recording. Of course, a user is able to place the camera 2 according to a specific usage scenario, and various usage scenarios are not listed one by one herein.

After use, the flexible circuit board 3 is rewound around the rotating roller 1 by rotating the rotating roller 1, so as to realize storage of the flexible circuit board 3, which is convenient for use. Of course, the camera 2 is able to take videos when the flexible circuit board 3 is wrapped around the rotating roller 1, and the user is able to adjust a position of the camera 2 according to the specific usage scenario.

The rotating roller 1 is capable of elastically rotating, so that the flexible circuit board 3 is elastically retractable around the rotating roller 1 After use, the rotating roller is elastically rotated in the elastic retracting direction of the flexible circuit board, so that the flexible circuit board automatically surrounds the rotating roller to realize storage of the flexible circuit board 3.

Specifically, the rotating roller 1 comprises a central shaft 11, a mounting base 12, and an elastic piece 13. The mounting base 12 is fixed in the housing 4. The elastic piece 13 enables the central shaft 11 to be elastically rotatably disposed on the mounting base 12. The second end of the flexible circuit board 3 is connected to the central shaft 11.

Furthermore, the elastic piece 13 is a clockwork spring. An accommodating cavity 111 is defined in a center of the central shaft 11. The clockwork spring is disposed in the accommodating cavity 111. A first end of the clockwork spring is connected to a side wall of the accommodating cavity 111. A second end of the clockwork spring is connected to the mounting base 12. When the user pulls the camera or the flexible circuit board to extend the camera, the central shaft rotates in the stretching direction, thereby driving the first end of the clockwork spring to rotate, causing the clockwork spring to be elastically compressed. After use, the clockwork spring is elastically reset, and the central shaft rotates elastically in the elastic retracting direction to store the flexible circuit board.

An inserting rod 121 is disposed on the mounting base 12. The inserting rod 121 is inserted into the accommodating cavity 111 and is connected to the second end of the clockwork spring. Specifically, a fixing groove 122 is defined in one end of the inserting rod, and the second end of the clockwork spring is fixed in the fixing groove to realize connection between the clockwork spring and the mounting base.

The camera device further comprises a locking device 5. When the flexible circuit board 3 stretches to a predetermined position, the locking device 5 is configured to lock the rotating roller 1 in the elastic retracting direction. When the locking device 5 is unlocked, the rotating roller 1 drives the flexible circuit board 3 to elastically retract, which is easy to use and has a reasonable design.

As shown in FIGS. 6-12, in a first embodiment of the locking device 5, a first mounting frame 41 is disposed in the housing 4. The locking device 5 comprises a ratchet 51 disposed on the rotating roller 1 and a check pawl 52 disposed on the first mounting frame 41. When the check pawl 52 is engaged with one of ratchet 51 teeth of the ratchet 51, the check pawl 52 locks the rotating roller 1 in the elastic retracting direction. When the check pawl 52 is disengaged from the one of the ratchet 51 teeth, the locking device unlocks the rotating roller, and the rotating roller 1 drives the flexible circuit board 3 to elastically retract. Specifically, the ratchet 51 is connected to the central shaft of the rotating roller, and the mounting base of the rotating roller is fixed on the first mounting frame.

Specifically, the locking device 5 further comprises a push rod 54 and a torsion spring 55. The push rod 54 is disposed on the first mounting frame 41. The push rod 54 is connected to the check pawl 52. A mounting shaft portion 42 and a stand column 43 are disposed on the first mounting frame 41. The torsion spring 55 is sleeved on the mounting shaft portion 42. A first end of the torsion spring 55 is connected to the push rod 54, and a second end of the torsion spring 55 is connected to the stand column 43.

When the user pulls the camera or the flexible circuit board, the ratchet does not affect a stretching of the flexible circuit board. After the flexible circuit board is stretched, under an action of the torsion spring, the check pawl on the push rod is inserted into one of the ratchet teeth of the ratchet to lock the rotating roller and prevent the flexible circuit board from elastically retracting. In addition, when the flexible circuit board needs to be elastically retracted, the user is able to operate the push rod to push the check pawl out of the one of the ratchet teeth for unlocking, so that the rotating roller drives the flexible circuit board to elastically retract. The operation is simple and the camera device is convenient to use.

As shown in FIGS. 13-20, in a second embodiment of the locking device 5, a second mounting frame 44 is disposed in the housing 4. The locking device 5 comprises a mounting plate 56 disposed on the rotating roller 1 and a swing arm 57 disposed on the second mounting frame 44. A locking guide rail 58 is disposed on the mounting plate 56, the swing arm 57 comprises a locking block 571, and the locking block 571 is placed in the locking guide rail 58, so that the locking block 571 is capable of locking the rotating roller 1 in the elastic retracting direction.

Specifically, the mounting plate is connected to the central shaft of the rotating roller, and the mounting base of the rotating roller is fixed on the second mounting frame.

Specifically, the locking guide rail 58 comprises a retraction guide rail 582 and an extension guide rail 581 disposed around the retraction guide rail 582. The locking block 571 is allowed to be disposed in the retraction guide rail 582. A communication port 583 is defined between the extension guide rail 581 and the retraction guide rail 582. A guide block 584 is disposed in the communication port 583. A front end of the guide block 584 defines a first guide portion 585. The first guide portion 585 of the guide block 584 is configured to guide the locking block 571 in the retraction guide rail 582 into the extension guide rail 581. A rear end of the guide block 584 defines a locking groove 586. The locking groove 586 comprises a second guide portion 587 and a third guide portion 588. The second guide portion 587 of the locking groove 586 is configured to guide the locking block 571 in the extension guide rail 581 to move into the locking groove 586. The third guide portion 588 of the locking groove 586 is configured to guide the locking block 571 in the locking groove 586 to move into the retraction guide rail 582.

Figure 16:
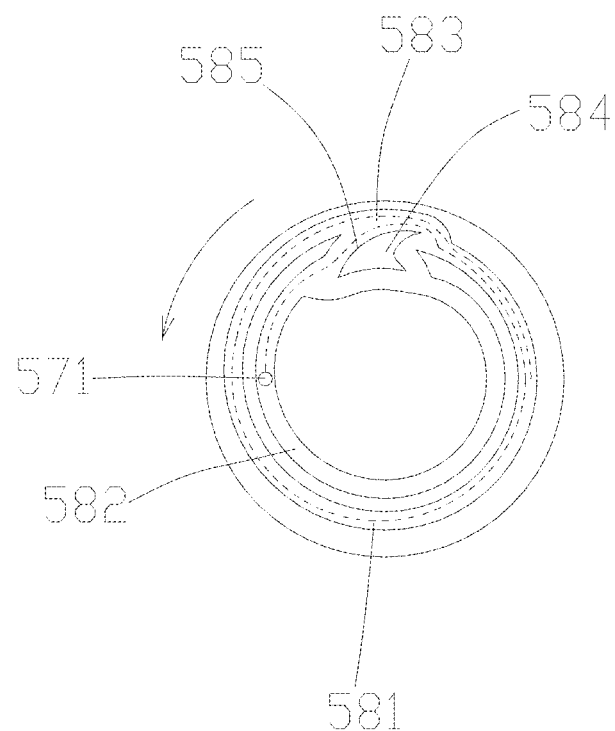
FIG. 16 is a schematic diagram of a trajectory of a relative movement of a retraction guide rail, an extension guide rail, and the locking block when the rotating roller (mounting plate) rotates in a stretching direction, where a dotted line thereof represents the trajectory.
Figure 17:
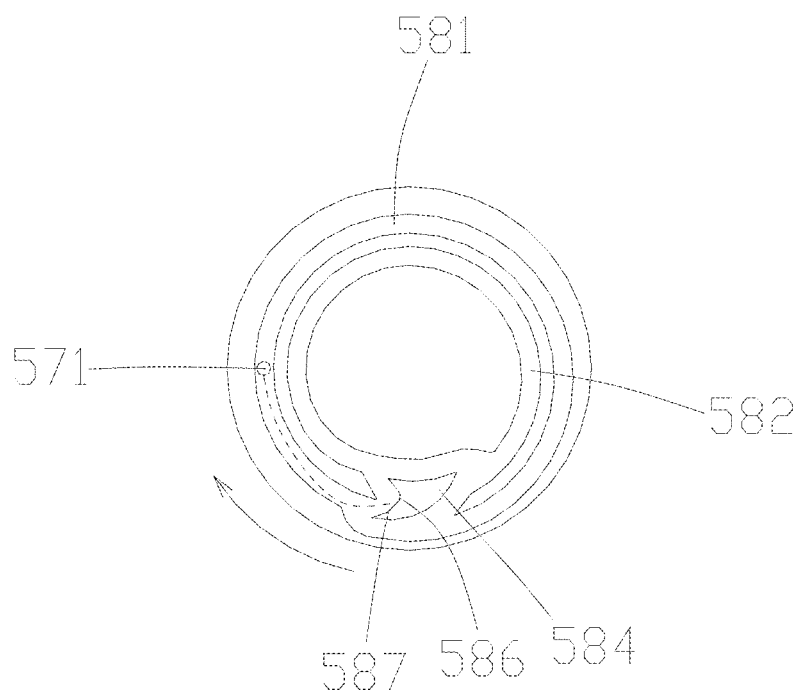
FIG. 17 is a schematic diagram of a trajectory of a relative movement of the extension guide rail and the locking block when the rotating roller (mounting plate) rotates in an elastic retracting direction, where a dotted line thereof represents the trajectory.
Figure 18:
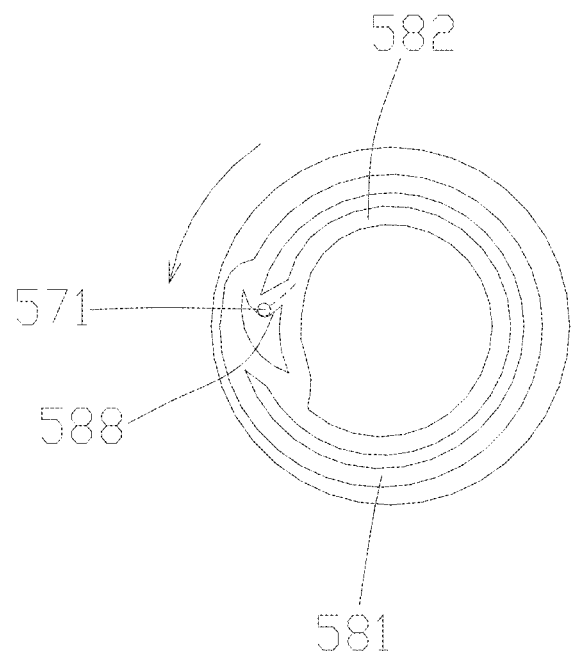
FIG. 18 is a schematic diagram of a trajectory of a relative movement of a locking groove and the locking block when the rotating roller (mounting plate) rotates in the stretching direction, where a dotted line thereof represents the trajectory.
Figure 19:
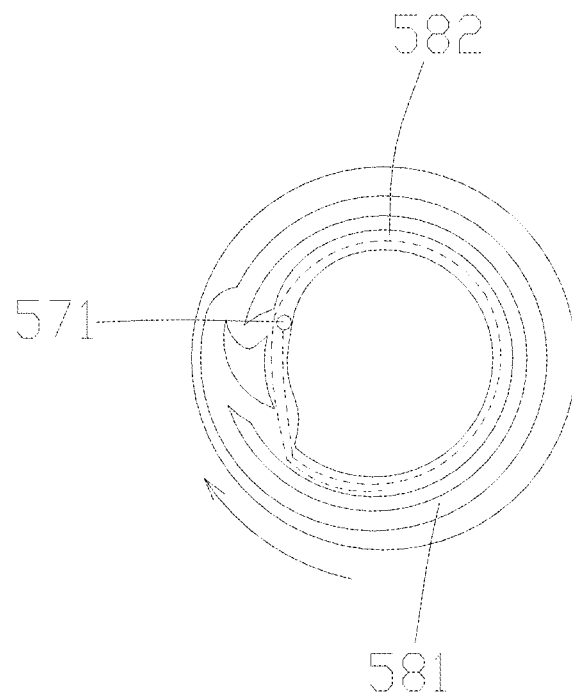
FIG. 19 is a schematic diagram of a trajectory of a relative movement of the retraction guide rail and the locking block when the rotating roller (mounting plate) rotates in the elastic retracting direction, where a dotted line thereof represents the trajectory.
Figure 20:
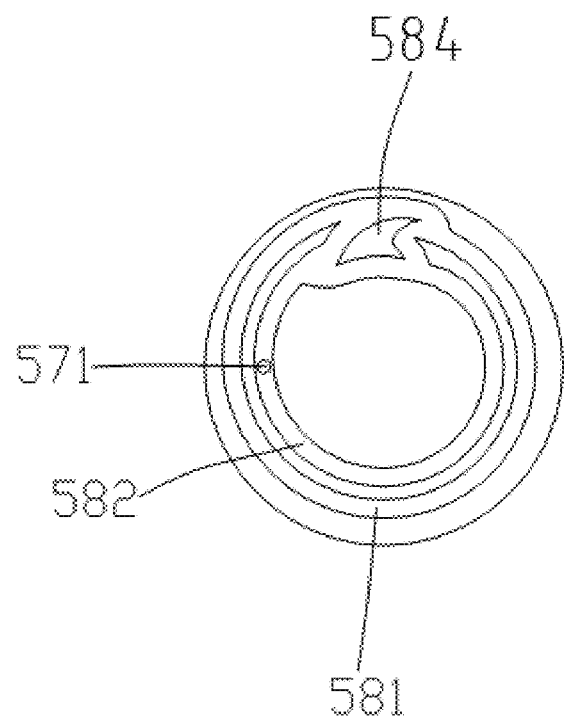
FIG. 20 is a schematic diagram of the locking block located in the retraction guide rail after the flexible circuit board is fully retracted.

As shown in FIG. 16, when the user pulls the camera or the flexible circuit board, the rotating roller (mounting plate) rotates in the stretching direction, and the retraction guide rail moves relative to the locking block. When the locking block is located at the communication port, since the rotating roller rotates and the locking block swings, the locking block enters the extension guide rail under an action of the first guide portion. Moreover, as the flexible circuit board continues to stretch, the extension guide rail moves relative to the locking block accordingly. As shown in FIG. 17, when the user stops pulling the camera or the flexible circuit board, since the rotating roller rotates elastically in the elastic retracting direction, the rotating roller may rotate slightly in the elastic retracting direction, thereby driving the flexible circuit board to partially retract elastically, so that the locking block is located at the communication port in the elastic retracting direction. Then, under the action of the second guide portion, the locking block in the extension guide rail is guided into the locking groove to lock the rotating roller. As shown in FIG. 18, when the flexible circuit board needs to be retracted, the user pulls the flexible circuit board slightly, so that the rotating roller rotates slightly in the stretching direction. Then, under the action of the third guide portion, the locking block in the locking groove is guided into the retraction guide rail, so that the locking block is separated from the locking groove, thereby unlocking the rotating roller. As shown in FIG. 19, as the rotating roller elastically rotates in the elastic retracting direction, the flexible circuit board continues to retract, and the retraction guide rail moves relative to the locking block accordingly. As shown in FIG. 20, after the flexible circuit board is fully retracted, the locking block is again located in the retraction guide rail.

Furthermore, the second mounting frame 44 comprises a limiting groove 45. The swing arm 57 is disposed in the limiting groove 45. The limiting groove 45 is configured to limit a swing stroke of the swing arm 57. The locking block 571 is protruded relative to the limiting groove 45. The second mounting frame 44 has a simple structure and is easy to assemble.

In the camera device, the camera 2 is disposed outside the housing 4. The flexible circuit board 3 comprises an upper flexible circuit board 21 and a upper flexible circuit board 22. The upper flexible circuit board 21 is stacked on the upper flexible circuit board 22. A first end of the upper flexible circuit board 21 is configured as a data connection end. A first end of the upper flexible circuit board 22 passes through the housing 4 and is connected to the camera 2, and a second end of the upper flexible circuit board 21 is connected to a second end of the upper flexible circuit board 22.

When in use, as the rotating roller rotates in the elastic stretching direction, the lower flexible circuit board stretches outward along with the camera, while the upper flexible circuit board is always located in the housing and is served as the data connection end. When the rotating roller rotates in the elastic retracting direction, the upper flexible circuit board and the lower flexible circuit board retract synchronously, and the upper flexible circuit board and the lower flexible circuit board are stacked up and down around the rotating roller, which have a reasonable and ingenious design.

The second end of the upper flexible circuit board 21 and the second end of the upper flexible circuit board 22 are integrally formed.

Furthermore, the rotating roller 1 comprises a connecting rod 14. A bending portion of the second end of the upper flexible circuit board 21 and a bending portion of the second end of the upper flexible circuit board 22 are sleeved on the connecting rod 14. Specifically, the bending portion 24 of the second end of the upper flexible circuit board 21 and the bending portion 24 of the second end of the upper flexible circuit board 22 respectively from sleeves, and the sleeves are sleeved on the connecting od.

The housing 4 defines an opening 43. The first end of the upper flexible circuit board 22 passes through the housing 4 from the opening 43.

Furthermore, a clamping groove 46 corresponding to the opening 43 is defined in an outer side of the housing 4, and the camera 2 is clamped in the clamping groove 46.

Furthermore, a lens of the camera 2 faces the housing 4, and when shooting, the camera should be taken out of the clamping groove 46. Alternatively, the lens of the camera 2 is disposed opposite to the housing 4, and when shooting, the camera 2 is allowed to be placed in the clamping groove 46.

A main circuit board 5 is disposed in the housing 4, and the data connection end of the upper flexible circuit board 21 is connected to the main circuit board 5.

A battery 7 is disposed in the housing for power supply. A charging interface 61 configured to charge the battery and a storage card accommodating groove 62 configured to accommodate a storage card are disposed on the main circuit board. Operation buttons 8 are disposed on the housing 4.

The above is one or more embodiments provided in combination with specific contents, and it is not intended that the specific embodiments of the present disclosure are limited to these descriptions. Any similarity with the method, structure, etc. of the present disclosure, or any technical deduction or replacement made on the premise of the concept of the present disclosure, shall fall within the protection scope of the present disclosure.

What is claimed is:

1. A camera device, comprising:
   a rotating roller;
   a camera;
   a flexible circuit board; and
   a housing;
   wherein the rotating roller is disposed in the housing, the flexible circuit board is of a strip shape, a first end of the flexible circuit board is connected to the camera, a second end of the flexible circuit board is connected to the rotating roller, and the flexible circuit board is disposed around the rotating roller, so that the camera is flexibly stretchable through the flexible circuit board.

2. The camera device according to claim 1, wherein the rotating roller is capable of elastically rotating, so that the flexible circuit board is elastically retractable around the rotating roller.

3. The camera device according to claim 2, wherein the rotating roller comprises a central shaft, a mounting base, and an elastic piece; wherein the mounting base is fixed in the housing, the elastic piece enables the central shaft to be elastically rotatably disposed on the mounting base, and the second end of the flexible circuit board is connected to the central shaft.

4. The camera device according to claim 3, wherein the elastic piece is a clockwork spring, an accommodating cavity is defined in a center of the central shaft, the clockwork spring is disposed in the accommodating cavity, a first end of the clockwork spring is connected to a side wall of the accommodating cavity, and a second end of the clockwork spring is connected to the mounting base.

5. The camera device according to claim 4, wherein an inserting rod is disposed on the mounting base, the inserting rod is inserted into the accommodating cavity and is connected to the second end of the clockwork spring.

6. The camera device according to claim 2, wherein the camera device further comprises a locking device, and when the flexible circuit board stretches to a predetermined position, the locking device is configured to lock the rotating roller in an elastic retracting direction; wherein when the locking device is unlocked, the rotating roller drives the flexible circuit board to elastically retract.

7. The camera device according to claim 6, wherein a first mounting frame is disposed in the housing, the locking device comprises a ratchet disposed on the rotating roller and a check pawl disposed on the first mounting frame; wherein when the check pawl is engaged with one of ratchet teeth of the ratchet, the check pawl locks the rotating roller in the elastic retracting direction, and when the check pawl is disengaged from the one of the ratchet teeth, the rotating roller drives the flexible circuit board to elastically retract.

8. The camera device according to claim 7, wherein the locking device further comprises a push rod and a torsion spring, the push rod is disposed on the first mounting frame, the push rod is connected to the check pawl, a mounting shaft portion and a stand column are disposed on the first mounting frame, the torsion spring is sleeved on the mounting shaft portion, a first end of the torsion spring is connected to the push rod, and a second end of the torsion spring is connected to the stand column.

9. The camera device according to claim 6, wherein a second mounting frame is disposed in the housing, the locking device comprises a mounting plate disposed on the rotating roller and a swing arm disposed on the second mounting frame, a locking guide rail is disposed on the mounting plate, the swing arm comprises a locking block, and the locking block is placed in the locking guide rail, so that the locking block is capable of locking the rotating roller in the elastic retracting direction.

10. The camera device according to claim 9, wherein the locking guide rail comprises a retraction guide rail and an extension guide rail disposed around the retraction guide rail, the locking block is allowed to be disposed in the retraction guide rail, a communication port is defined between the extension guide rail and the retraction guide rail, a guide block is disposed in the communication port, a front end of the guide block defines a first guide portion, the first guide portion of the guide block is configured to guide the locking block in the retraction guide rail into the extension guide rail, a rear end of the guide block defines a locking groove, the locking groove comprises a second guide portion and a third guide portion, the second guide portion of the locking groove is configured to guide the locking block in the extension guide rail to the locking groove, and the third guide portion of the locking groove is configured to guide the locking block in the locking groove to the retraction guide rail.

11. The camera device according to claim 10, wherein the second mounting frame comprises a limiting groove, the swing arm is disposed in the limiting groove, the limiting groove is configured to limit a swing stroke of the swing arm, and the locking block is protruded relative to the limiting groove.

12. The camera device according to claim 2, wherein the camera is disposed outside the housing, the flexible circuit board comprises an upper flexible circuit board and a lower flexible circuit board; wherein the upper flexible circuit board is stacked on the lower flexible circuit board, a first end of the upper flexible circuit board is configured as a data connection end, a first end of the lower flexible circuit board passes through the housing and is connected to the camera, and a second end of the upper flexible circuit board is connected to a second end of the lower flexible circuit board.

13. The camera device according to claim 12, wherein the second end of the upper flexible circuit board and the second end of the lower flexible circuit board are integrally formed.

14. The camera device according to claim 13, wherein the rotating roller comprises a connecting rod, and a bending portion of the second end of the upper flexible circuit board and a bending portion of the second end of the lower flexible circuit board are sleeved on the connecting rod.

15. The camera device according to claim 12, wherein the housing defines an opening, and the first end of the lower flexible circuit board passes through the housing from the opening.

16. The camera device according to claim 15, wherein a clamping groove corresponding to the opening is defined in an outer side of the housing, and the camera is clamped in the clamping groove.

17. The camera device according to claim 16, wherein a lens of the camera faces the housing, or the lens of the camera is disposed opposite to the housing.

18. The camera device according to claim 12, wherein a main circuit board is disposed in the housing, and the data connection end of the upper flexible circuit board is connected to the main circuit board.

19. A camera device, comprising:
   a rotating roller;
   a camera; and
   a flexible circuit board;
   wherein the flexible circuit board is of a strip shape, a first end of the flexible circuit board is connected to the camera, a second end of the flexible circuit board is connected to the rotating roller, and the flexible circuit board is disposed around the rotating roller, so that the camera is flexibly stretchable through the flexible circuit board.

20. The camera device according to claim 19, wherein the rotating roller is capable of elastically rotating, so that the flexible circuit board is elastically retractable around the rotating roller.

* * * * *